United States Patent

[11] 3,586,406

[72] Inventor Victor L. Barr
 Jenkintown, Pa.
[21] Appl. No. 841,277
[22] Filed July 14, 1969
[45] Patented June 22, 1971
[73] Assignee Roller Bearing Company of America
 West Trenton, N.J.

[54] TANDEM ROLLER BEARING
 9 Claims, 13 Drawing Figs.

[52] U.S. Cl. .................................................. 308/217
[51] Int. Cl. .................................................. F16c 33/46
[50] Field of Search ......................................... 308/213,
 212, 207, 217, 201

[56] References Cited
 UNITED STATES PATENTS
2,765,203 10/1956 Barr et al. ...................... 308/212
3,248,155 4/1966 Schaeffler ...................... 308/212
3,382,016 5/1968 Schmidt ........................ 308/207

Primary Examiner—Martin P. Schwadron
Assistant Examiner—Frank Susko
Attorney—Jackson, Jackson & Chovanes ABSTRACT: A tandem cage-type cylindrical needle roller bearing having a race ring which is provided with a raceway and integral flanges at both ends of the raceway, the flanges having circumferential surfaces around the axis, needle rollers in contact with the raceway between the flanges, the rollers being arranged in tandem groups side by side, preferably two in each group, in which the rollers of each tandem group are mutually in contact, and a jointless tubular cage extends circumferentially around the bearing, the cage having rims which ride the circumferential surfaces of the flanges, the cage having windows or pockets in which the tandem groups of rollers are retained in the race, the windows being spaced circumferentially by cage crossbars, the crossbars at the axial ends being connected to the cage rim adjoining the circumferential surfaces of the flanges, the crossbars having guiding surfaces substantially in the pitch circle and located near the ends of the rollers (within 25 percent of the roller length of the ends) for engaging circumferential sides of the rollers, preferably in abutting relation, and also retaining surfaces located on the side of the pitch circle remote from the raceway and close enough together to restrain the tandem group of rollers from leaving the window or pocket, the retaining surfaces preferably converging in the general radial direction away from the adjoining raceway.

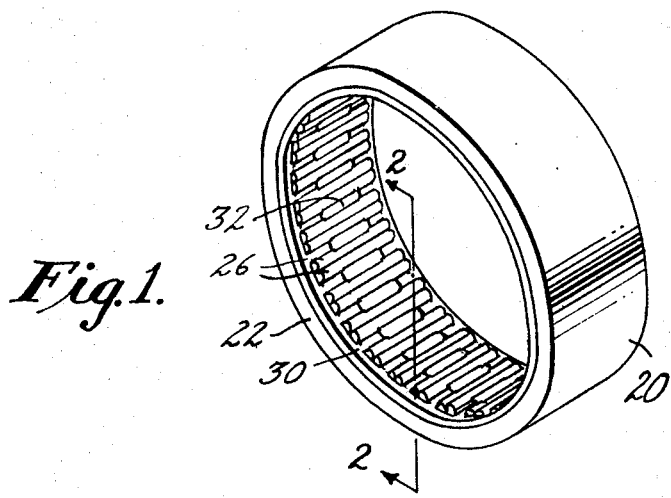
Fig.1.
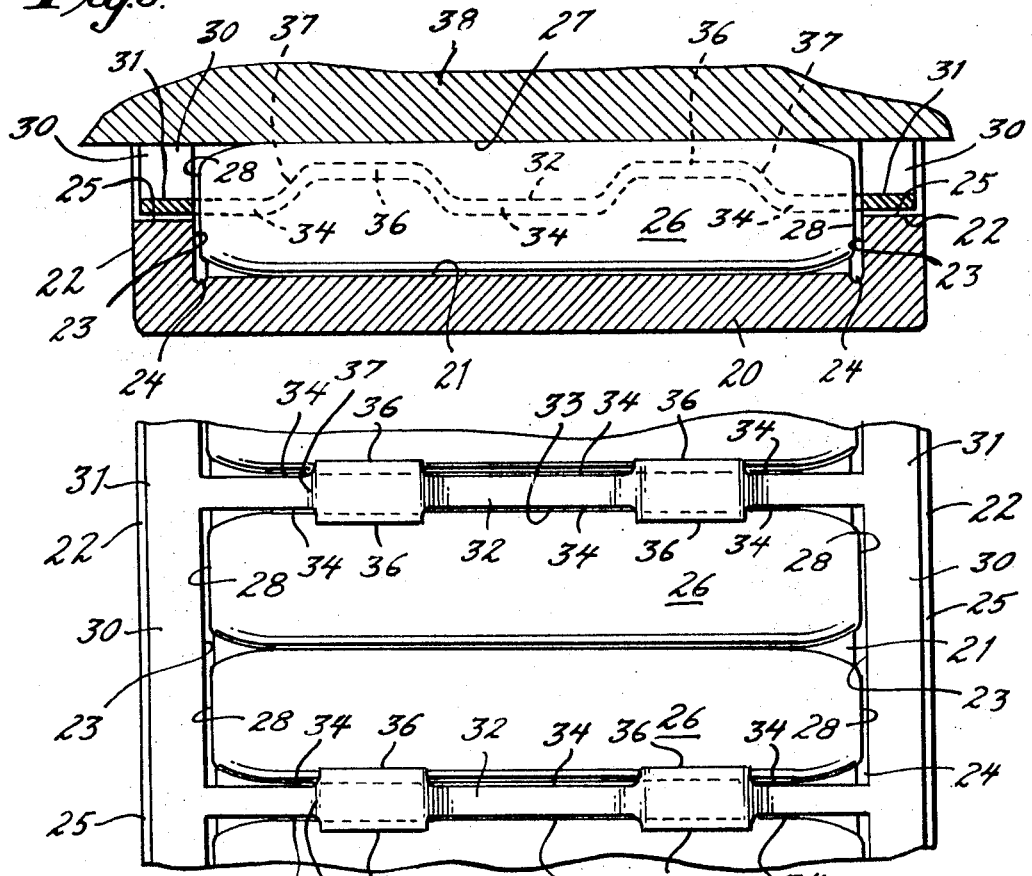
Fig.5.
Fig.6.
INVENTOR.
VICTOR L. BARR
ATTORNEYS.

PATENTED JUN 22 1971
3,586,406
SHEET 2 OF 4
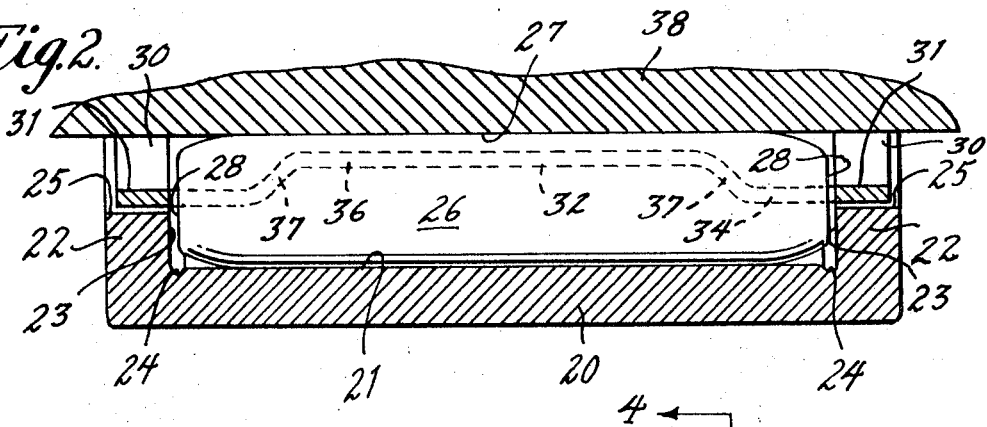
Fig. 2.
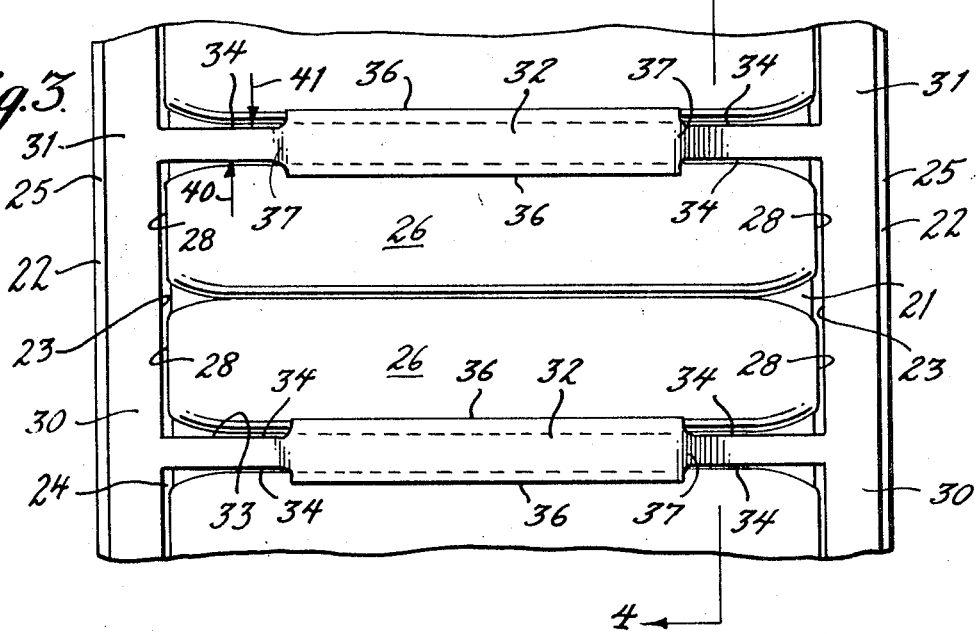
Fig. 3.
Fig. 4.
INVENTOR.
VICTOR L. BARR
BY
ATTORNEYS.

INVENTOR.
VICTOR L. BARR

ATTORNEYS

INVENTOR.
VICTOR L. BARR

BY
ATTORNEYS

TANDEM ROLLER BEARING

DISCLOSURE OF INVENTION

The present invention relates to a tandem roller bearing of the Schmidt type, as shown in Heinrich Schmidt U.S. Pat. No. 3,382,016, granted May 7, 1968, for Arrangement of Tandem Rollers in a Roller Bearing and Method of the Assembly of the Same. The invention is concerned with an improvement in such a bearing, particularly in respect to the construction of the cage.

The present invention applies to a cage-type cylindrical needle roller bearing. By this, it is meant that the rollers are relatively elongated, having a length of at least three times the roller diameter.

In a bearing of the type under discussion, there is danger of cocking or skewing of the rollers due to relative drag at one end of the rollers, for example, because of elastic flattening of the rollers at one end due to unequal load distribution. Therefore, the design and operation of the cage is a very important feature in a bearing of this type.

In a bearing of the type under discussion, a race ring is provided having a cylindrical raceway and integral flanges on both ends of the raceway, the flanges usually being symmetrical. The flanges have circumferential surfaces in an axial direction, and a rim at each end of the cage rides on these circumferential surfaces. While the race ring and the flanges can be either internal or external, in most bearings of the type under discussion the race ring is external, cooperating with an internal shaft or race, and for convenience in illustration and description, but without intention to limit, this form will be shown and described in detail.

The invention is concerned particularly with bearings having in each window or pocket of the cage two, three or more needle rollers, the rollers in the pocket forming a tandem group, one cylindrical side of one roller in the group engaging the cage, other cylindrical roller surfaces engaging one another, and one cylindrical roller surface having a slight clearance from the cage.

Tandem needle bearings of the Schmidt type have given very good service in heavily loaded and exacting applications, one of which is in the hinge bearings of helicopter rotor blades. It will be understood that adjoining the hub of the helicopter rotor there are usually bearings in three positions, a flapping hinge, a lead-lag hinge, and pitch change bearings. Tandem roller bearings have given very good service in initial use for the first two positions.

After extended service, in some cases it has been found that the flapping or lead-lag hinge bearing, however, has deteriorated to such an extent that the parts have galled and greatly distorted, causing replacement of the bearing lest failure of the helicopter might result. From examination of these failures, I have discovered that the guiding and retaining surfaces of the cage crossbars which separate one tandem roller window or pocket from another at positions adjacent the ends of the rollers (within 25 percent of the roller length of the end) have first worn excessively so that the windows or pockets have become deeper and wider, and then the retaining surfaces of the crossbars at the ends, being then located relatively far from the pitch line at a position at which the radial component of the force by the roller on the crossbar is relatively great, the crossbars have been cammed by the rollers in a radial direction (inward in the case of an external raceway) so that they have jammed against the shaft, have become heated and actually have galled the parts, which could cause the bearing to lock and fail. One of the difficulties which has developed in the prior art tandem roller bearing, as discussed above, after considerable service is that the windows tend to widen and deepen permitting excessive freedom to the rollers, so that at times when the shaft or inner race is removed, rollers may actually drop out of the windows.

I have discovered that this type of failure can be prevented in tandem roller bearings of the type under discussion by redesigning and changing the construction of the crossbars of the cage so that there are separate guiding portions of the cage crossbars engaging the rollers near the ends (within 25 percent of the roller length of the ends) at a position in or close to the pitch circle, where there is no tendency to cam the cage radially, and there are separate retaining positions on the cage crossbars, which may be located near the ends or toward the midline.

One of the important aspects of the present invention is that guiding surfaces on the cage crossbars engage the rollers substantially in the pitch circle for a substantial distance near the ends of the rollers where the guiding surfaces are most effective against skewing of the rollers because they act on the longest lever arm.

The drawings show only a few of the numerous embodiments in which the invention may appear, the forms shown being selected from the standpoints of satisfactory operation, clear illustration and effective demonstration of the principles involved.

FIG. 1 is a perspective of a race ring, cage and rollers of one form of bearing of the invention, omitting the inner race or shaft.

FIG. 2 is a fragmentary enlarged section on the line 2-2 of FIG. 1, including the inner race or shaft.

FIG. 3 is a fragmentary interior elevation of the bearing, showing the race ring, rollers and the cage and omitting the inner race or shaft.

FIG. 4 is a section of FIG. 3 on the line 4-4.

FIG. 5 is a view similar to FIG. 2 illustrating a variation.

FIG. 6 is a view similar to FIG. 3 showing the variation of FIG. 5.

Figure 7:
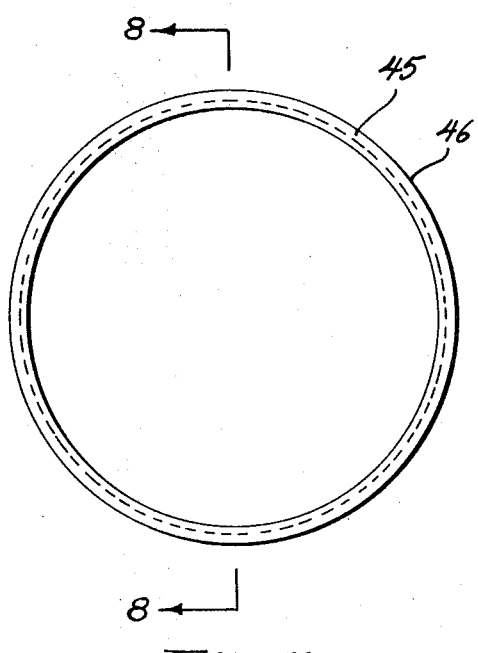
FIG. 7 is an end view of a cage blank for a modified bearing according to the invention.

Considering first the form of FIGS. 1 to 4 inclusive, a race ring 20, here shown as being an external race ring, has an inwardly directed cylindrical raceway 21 on which the rollers ride, and integral suitably symmetrical end flanges 22 which form the end structure of the raceway. The flanges 22 have suitably radially extending inner end walls 23, which join the raceway 21 by an undercut fillet 24 which is used to aid in grinding the surfaces. The flanges 22 extend radially inward from the raceway 21 for a distance suitable to contact the ends of the rollers, which in the case of blunt ended rollers as shown is desirably more than 25 percent of the roller diameter.

On the inner edges of the flanges 22 there are cage-engaging coaxial cylindrical or circumferential surfaces 25 on the flanges.

Rollers 26 in the raceway have cylindrical side surfaces 27 and square ends 28, the rollers desirably being of random lengths and riding against the end walls 23 of the integral flanges 22. The rollers are straight except for any crowning toward the ends. The rollers 26 are desirably of elongated or needle type, suitably having a length in excess of three times the roller diameter.

An endless circular cage 30, suitably made of metallic tubing, has adequate clearance from the inner cylindrical surface 25 of the flanges so as to make a slip-fit, the clearance preferably being of the order of 0.005 inch per inch of diameter. It will be evident that the tubing can be manufactured by welding sheet or strip before or after the forming of the pockets. It will also be evident that other materials besides metals, for example plastics such as phenolic plastics may be employed for making the cage. Endless cylindrical rims 31 on the cage support the cage by their engagement with the flanges of the raceway. It is important that the cage be thin enough to permit insertion of the rollers by deflection of the cage as described in detail in Schmidt U.S. Pat. No. 3,382,016 above referred to. One very successful cage has a rim wall thickness of about 45 percent of the roller diameter.

At circumferential points between tandem groups of rollers, as for example, between every second roller or every third roller, the cage rims 31 are connected by integral metallic crossbars 32, the space defined by the crossbars at intervals around the circumference and between the rims forming windows or pockets 33 which are usually produced by stamping openings in the cage.

The windows may conveniently be slightly longer than the rollers, since the rollers are retained at the ends by the flanges 22.

The crossbars at the ends of the rollers have guiding surfaces 34 which engage the roller ends by abutting against them approximately in the pitch circle, that is, the surface of revolution which includes the axes of all the rollers. While the engagement can be slightly out of the pitch circle, it should be within plus or minus 10 percent of the roller diameter from the pitch circle. This feature is important because it is desired to avoid any tendency to cam the crossbars radially at the point where the guiding surfaces of the crossbars engage the rollers.

In the form of FIGS. 1 to 4, at points toward the midlength of the cage with respect to the guiding surfaces 34, the crossbars provide retaining surfaces 36 which are located substantially radially inwardly of the pitch circle, and which in effect form lips which interfere with movement of the rollers radially inwardly. The retaining surfaces or lips 36 are converging as they progress radially inwardly, the surfaces being either flat or following the curvature of the rollers as desired. In some cases, as shown in FIGS. 5 and 6, there are a plurality of retaining surfaces or lips 36 distributed lengthwise of the crossbars, with an intermediate guiding surface 34 engaging the rollers in the pitch circle.

In order to enable the retaining surfaces 36 to provide the required interference against inward motion of the rollers, it may be necessary to bend the crossbar at 37 (FIG. 5) intermediate between the guiding surfaces 34 and the retaining surfaces 36.

Thus it will be evident that the distance measured on the arc of the circle between the guiding surfaces 34 at opposite sides of a given window or pocket is slightly in excess of a multiple of the roller diameter (two times where there are two rollers in the pocket, or three times where there are three rollers in the pocket) so as to allow for a slight clearance for the roller to turn. On the other hand, the distances between the adjoining portions of the retaining surfaces 36 at the opposite sides of the pocket are less than this multiple of the roller diameter by the distance required to provide interference, that is, for example, between one-eighth and one-fifteenth the roller diameter per side. Good results have been obtained with interference of the order of one-tenth the roller diameter per side.

FIGS. 7 to 12a relate to a form of the invention which is preferred from the standpoint of easy manufacture of the cage. In this device, the cage crossbars have retaining surfaces 36 at the ends of the windows, but have guiding surfaces 34 approximately in the pitch circle which contact the roller within 25 percent of the roller length of the end.

Figure 8:
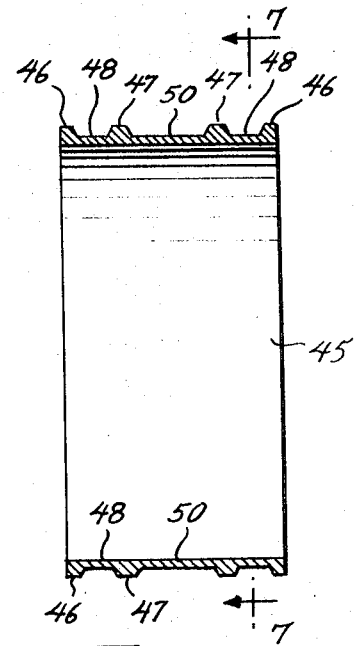
FIG. 8 is a section on the line 8-8 of FIG. 7.
Figure 9:
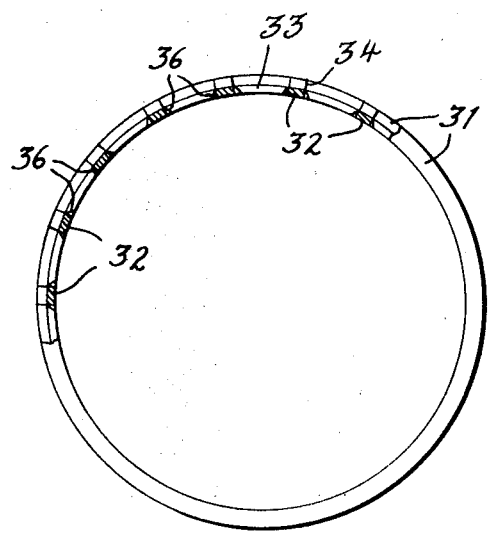
FIG. 9 is an end elevation of a modified cage of the invention, using the blank of FIG. 7 and 8, partly in section on the line 7-7 of FIG. 8.
Figure 11:
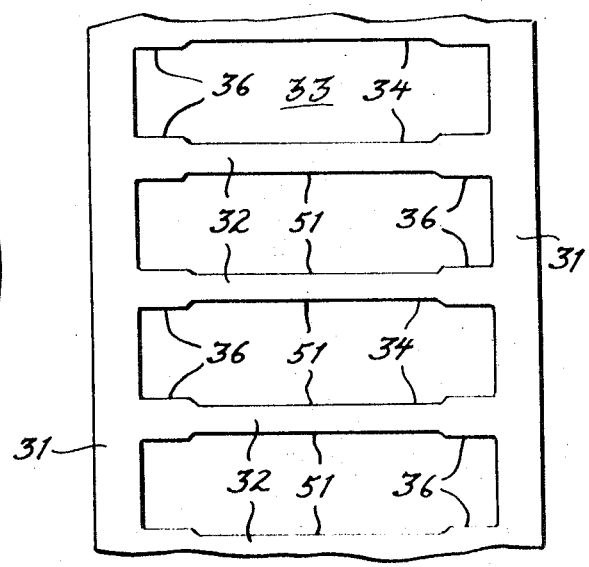
FIG. 11 is a fragmentary radial inside elevation of a cage of FIG. 9.
Figure 12:
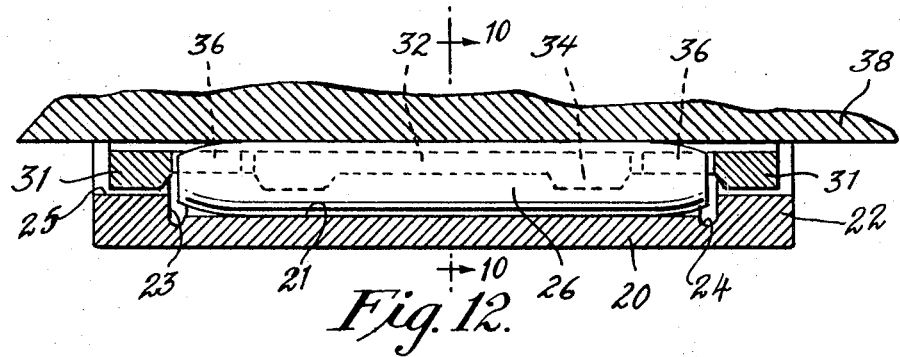
FIG. 12 is a section similar to FIG. 2 showing the cage of FIG. 9.
Figure 12A:
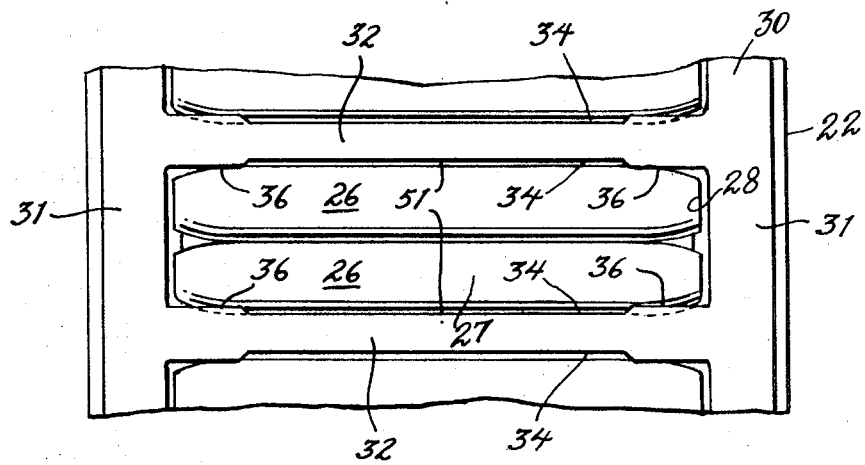
FIG. 12a is a fragmentary inside elevation similar to FIG. 3 showing a bearing using the cage of FIGS. 9 to 12.
Figure 10:
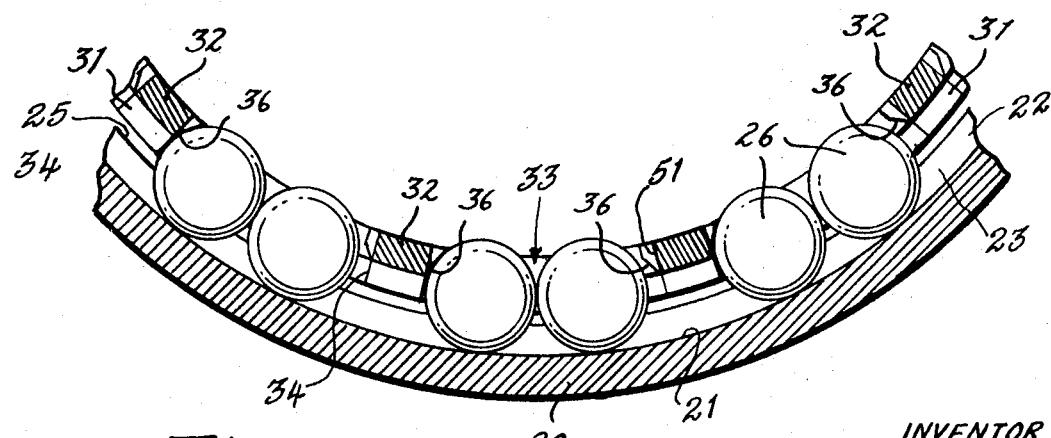
FIG. 10 is a fragmentary section of an outer race, cage and rollers to enlarged scale, using the cage of FIG. 9. This view resembles FIG. 4, and is sectioned on the line 10-10 of FIG. 12.

FIGS. 7 and 8 show a cage blank for making the cage of the bearing of FIGS. 9 to 12a. The cage blank 45 is a tube having external annular ribs 46 at the ends where the cage rims 31 are to be formed. Spaced from the rib 46 toward the midlength line is a second annular external rib 47, for forming the roller guiding surfaces 34. This is located within 25 percent of the roller length of the end. Between the ribs 46 and 47 there is a thin tubular portion at 48 which is coined to produce the retaining surfaces 36 and protects against causing damage to the rib 46 and the rim 31 by forming the retaining surfaces 36. The rib 47 terminates toward the midlength line to leave a thin tubular portion 50 which can preferably be out of contact with the roller.

Thus in FIGS. 10 to 12a I show cage crossbars 32 between windows having retaining surfaces 36 near each end and located inward of the pitch circle (in a bearing having the race on the outside as shown), having at about the pitch circle roller guiding surfaces 34 which are near the ends of the rollers (within 25 percent of the roller length of the end) and having toward the midlength line surfaces 51 which can if desired be slightly relieved so as not to engage the rollers at all.

Once the rollers in any of the forms are inserted in the cage following the practice of the Schmidt patent as above referred to, causing the crossbars to deflect and then restoring the crossbars elastically to the shape shown, the bearing is completely assembled, ready for insertion of an internal shaft or inner race 38.

In normal practice, the rollers and the raceway are hardened and the cage can, if desired, be case hardened. The shaft will suitably be of hardened steel provided no inner race is used.

It will be evident that the bearing has a load zone, and that at one end of the load zone the cage is pushing the roller into the load zone, and at the other end of the load zone, the roller is pushing the cage, regardless of whether the bearing is rolling or oscillating. In an oscillating bearing of the type of certain blade bearings in a helicopter, the load zone may extend some 180° to 210° around the circumference due to the bending of the housing.

In the load zone, as best shown in FIG. 3, wherever the bearing may tend to cock ro skew, as suggested by arrow 40, the guiding surface of the crossbar near the end of the bearing is available to exert a guiding force as suggested by the arrow 41. Closer to the midlength point in FIGS. 1 to 6 and nearer to the end of the rollers in FIGS. 7 to 12a, on the other hand, the retaining surfaces or lips 36 prevent the roller from moving inward out of the raceway. Since, however, the guidance is performed at the pitch circle by surfaces 34, near the ends of the rollers, there will not be any tendency to cam the crossbar inwardly. The length of the guiding surfaces near the ends of the rollers should be of the order of 2 to 20 percent of the roller length, in order to avoid excessive pressure on the guiding surfaces.

In operation, therefore, it will be understood that once the bearing is assembled, as above-described, if there is a tendency to concentrate the load on one end of the roller at a particular point so that it tends to flatten and to turn at a slightly different rotational speed than the other end of the roller, so as to create a skewing force, guidance is readily provided by the crossbar surfaces 34 which engage the outermost rollers at one side of the pocket, while guidance is provided by the other roller or rollers in the pocket on surfaces where one roller engages the other. In correcting skewing action, there is not any contact between the roller and the retaining surface 36 of the crossbar and, therefore, the camming effect which was previously experienced to cause the cage to jam cannot occur in a bearing of the present invention.

It is believed that the form shown in FIGS. 9 to 12a is the preferred embodiment, although the other forms provide effective bearings.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. A tandem cage-type cylindrical needle roller bearing having a race ring provided with a raceway and integral flanges at both ends of the raceway, the flanges having circumferential surfaces extending parallel to the axis, needle rollers in contact with the raceway between the flanges, the rollers being arranged in tandem groups side by side in which the rollers of each tandem group are mutually in contact, and an endless tubular cage extending circumferentially of the bearing, the cage having rims which ride the circumferential surfaces of the flanges, the cage having windows in which the tandem groups of rollers are retained, the windows being spaced by cage crossbars, and the crossbars at the axial ends being connected to the cage rims adjoining the circumferential surfaces of the flanges, the cage crossbars having guiding surfaces which engage sides of the rollers within 25 percent of the roller length of the axial ends of the rollers in the pitch circle of the rollers, and the cage crossbars having retaining surfaces located on the side of the pitch circle remote from the raceway and sufficiently close together to prevent radial displacement of the tandem group of rollers in each window, the crossbars in the longitudinal direction being nonstraight, having guide surfaces in the pitch line and portions extending radially beyond the portions having the guide surfaces which provide retaining surfaces beyond the pitch line.

2. A bearing of claim 1 in which the cage crossbar guiding surfaces engage the sides of the rollers within 10 percent plus or minus of the roller diameter, from the pitch circle.

3. A bearing of claim 1, having two rollers side by side in each tandem group within each window.

4. A bearing of claim 1, in which the guiding surfaces on the crossbars abut against the cylindrical surfaces of the rollers in the pitch line circle.

5. A bearing of claim 4, in which the retaining surfaces of the crossbars converge in the general radial direction away from the adjoining raceway.

6. A bearing of claim 1, in which the retaining surfaces of the crossbars converge in the general radial direction away from the adjoining raceway.

7. A bearing of claim 1, in which the crossbars also have guiding surfaces which abut against the sides of rollers at the pitch circle adjacent the midline of the length of the bearing.

8. A bearing of claim 1, in which retaining surfaces are located toward the ends of the rollers with respect to the guiding surfaces.

9. A bearing of claim 1, in which retaining surfaces are located toward the midline with respect to the guiding surfaces.